(12) United States Patent
Norman et al.

(10) Patent No.: US 9,482,530 B2
(45) Date of Patent: Nov. 1, 2016

(54) NADIR/ZENITH INERTIAL POINTING ASSISTANCE FOR TWO-AXIS GIMBALS

(71) Applicant: RAYTHEON COMPANY, Waltham, MA (US)

(72) Inventors: Walter W. Norman, Allen, TX (US); Armando Villarreal, Garland, TX (US)

(73) Assignee: Raytheon Company, Waltham, MA (US)

( * ) Notice: Subject to any disclaimer, the term of this patent is extended or adjusted under 35 U.S.C. 154(b) by 570 days.

(21) Appl. No.: 14/072,559

(22) Filed: Nov. 5, 2013

(65) Prior Publication Data

US 2016/0223327 A1    Aug. 4, 2016

(51) Int. Cl.
  *G01C 15/00*   (2006.01)
  *G02B 27/64*   (2006.01)
  (Continued)

(52) U.S. Cl.
  CPC ............. *G01C 15/002* (2013.01); *G01C 19/42* (2013.01); *G01P 15/003* (2013.01); *G02B 27/644* (2013.01)

(58) Field of Classification Search
  CPC .. G01C 21/165; G01C 21/18; G01C 25/005; G01C 25/00; G01C 19/00; G01C 19/04; G01C 19/30; G01C 19/54; G01S 13/90; G01S 13/44; G01S 13/4463; G01S 13/68; G01S 13/72; G01S 13/86; G01S 13/9035; G01S 7/4004; F41G 3/22; F41G 3/06; F41G 3/10; F41G 3/165; F41G 5/20; F41G 5/24; F41G 7/36; Y10T 74/1218; Y10T 74/1221; Y10T 74/1229; Y10T 74/125; Y10T 74/1254; Y10T 74/1257; Y10T 74/1279; Y10T 74/1282
  USPC ............... 250/201.1, 203.1, 216, 206.2, 234; 244/3.18, 175, 3.16, 3.2; 318/582, 580, 318/649; 342/106, 174, 107, 154, 188, 195, 342/61, 62, 63, 67, 75, 77; 343/705, 765, 343/872; 74/5.31, 5.4; 89/41.06, 41.07, 89/41.14, 41.18
  See application file for complete search history.

(56) References Cited

U.S. PATENT DOCUMENTS

| | | | |
|---|---|---|---|
| 2,077,398 A | * | 4/1937 | Clark ..................... G01C 21/02 244/3.18 |
| 2,740,962 A | * | 4/1956 | Hammond, Jr. ...... G01S 13/422 318/691 |

(Continued)

FOREIGN PATENT DOCUMENTS

| | | |
|---|---|---|
| EP | 0481230 A2 | 4/1992 |
| WO | 8703955 | 7/1987 |

OTHER PUBLICATIONS

Masten, M.K., "Inertially Stabilized Platforms for Optical Imaging Systems", IEEE Control SYstems Magazine, IEEE Service Center, Piscataway, NJ, US, vol. 28, No. 1, Feb. 1, 2008.

(Continued)

*Primary Examiner* — David A Vanore
(74) *Attorney, Agent, or Firm* — Burns & Levinson LLP; Joseph M. Maraia

(57) ABSTRACT

Control systems and methods are provided for improved azimuthal pointing control near gimbal zenith/nadir in two-axis gimbal systems mounted to moveable platforms. The system includes a two-axis gimbal and a two-axis pointing device mounted to the two-axis gimbal. The two-axis pointing device directs a line of sight axis based upon a commanded steering direction and movement of the platform in the inertial frame of the line of sight. The two-axis gimbal follows the movement of the two-axis pointing device, keeping the two-axis pointing device from encountering its mechanical limits. In this manner, inertial pointing control is maintained in the near gimbal zenith/nadir regime.

16 Claims, 6 Drawing Sheets

(51) Int. Cl.
*G01C 21/18* (2006.01)
*G01P 15/00* (2006.01)
*G01C 19/42* (2006.01)

(56) References Cited

U.S. PATENT DOCUMENTS

| | | | | |
|---|---|---|---|---|
| 3,015,457 A * | 1/1962 | Dixson | G01C 21/165 | 244/175 |
| 3,027,841 A * | 4/1962 | Dixson | G01C 21/165 | 244/175 |
| 3,181,812 A * | 5/1965 | Dixson | G01C 21/165 | 244/3.18 |
| 3,230,348 A * | 1/1966 | Hammond, Jr. | F41G 7/24 | 235/400 |
| 3,312,423 A * | 4/1967 | Welch | F41G 7/36 | 244/3.18 |
| 3,439,427 A * | 4/1969 | Gow | B64G 3/00 | 250/203.6 |
| 4,148,029 A * | 4/1979 | Quesinberry | G01S 13/68 | 342/106 |
| 4,179,696 A * | 12/1979 | Quesinberry | G01S 13/72 | 235/412 |
| 5,163,176 A * | 11/1992 | Flumerfelt | G01S 7/2813 | 342/174 |
| 5,172,122 A * | 12/1992 | Peregrim | G01S 7/2813 | 342/154 |
| 5,225,838 A * | 7/1993 | Kanter | G01S 7/36 | 342/61 |
| 6,396,235 B1 * | 5/2002 | Ellington | F41G 3/22 | 318/649 |
| 7,095,376 B1 * | 8/2006 | Timothy | H01Q 3/08 | 343/705 |
| 7,333,064 B1 * | 2/2008 | Timothy | H01Q 1/125 | 343/705 |
| 7,894,144 B2 | 2/2011 | Wein et al. | | |
| 8,174,580 B2 * | 5/2012 | Hayashi | H04N 5/232 | 348/169 |
| 8,798,450 B2 * | 8/2014 | Aicher | G01C 21/18 | 248/184.1 |
| 8,833,232 B1 * | 9/2014 | Fox | F41A 27/18 | 89/41.06 |
| 9,074,888 B2 * | 7/2015 | Linton | G01C 19/04 | |
| 9,217,643 B1 * | 12/2015 | Belenkii | G01S 5/16 | |
| 9,243,931 B2 * | 1/2016 | Linton | G01C 21/18 | |
| 2003/0024333 A1 * | 2/2003 | Wyse | G01C 19/30 | 74/5.4 |
| 2008/0055413 A1 | 3/2008 | Hayashi | | |
| 2010/0079101 A1 | 4/2010 | Sidman | | |
| 2010/0141503 A1 * | 6/2010 | Baumatz | G01S 7/48 | 342/27 |
| 2011/0304736 A1 | 12/2011 | Evans et al. | | |
| 2013/0092785 A1 | 4/2013 | Tournes et al. | | |
| 2013/0242123 A1 | 9/2013 | Norman et al. | | |
| 2014/0049643 A1 * | 2/2014 | Segerstrom | F21V 21/30 | 348/144 |
| 2016/0107769 A1 * | 4/2016 | Verbin | G01C 19/30 | 244/165 |

OTHER PUBLICATIONS

Hurak, Zdeněk K. et al., "Control Design for Image Tracking with an Inertially Stabilized Airborne Camera Platform", Proceedings of SPIE, vol. 7696, Apr. 22, 2010.
Profeta, J.A. et al, "Torque Disturbance Rejection in High Accuracy Tracking Systems", IEEE Transactions of Aerospace and Electronic Systems, IEEE Service Center, Piscataway, NJ, US, vol. 26, No. 2, Mar. 1, 1990.
International Preliminary Report on Patentability from related PCT Application No. PCT/US2014/052498 issued May 10, 2016.

* cited by examiner

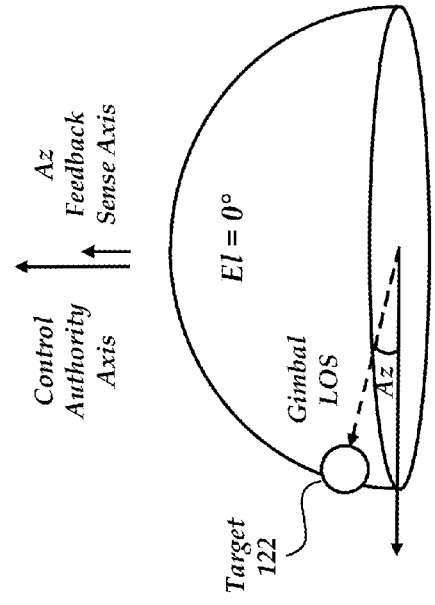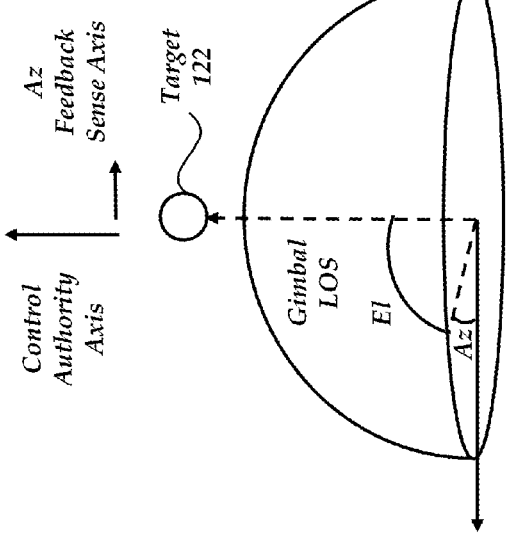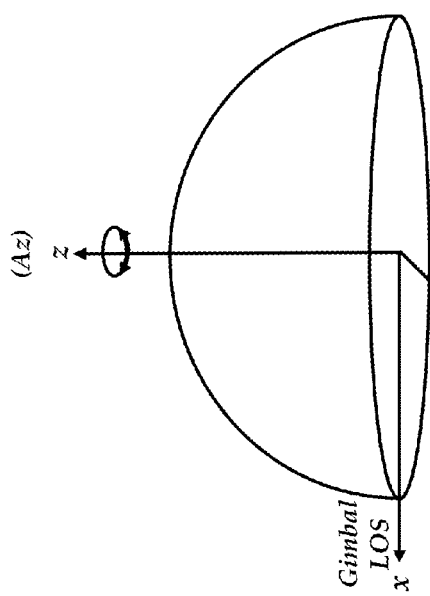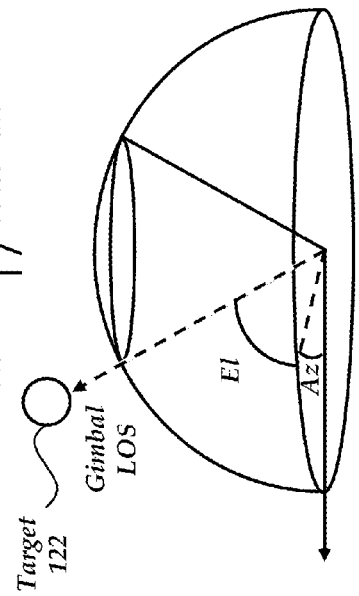

NADIR/ZENITH INERTIAL POINTING ASSISTANCE FOR TWO-AXIS GIMBALS

BACKGROUND

Gimbal mounts are often used for precise Line of Sight (LOS) pointing in systems such as antennae, cameras, telescopes, turrets, and the like. In general, gimbals are support structures which can pivot about one or more axes. For example, a two-axis gimbal system may include two gimbals, with each gimbal configured to rotate about a different, orthogonal axis. An outer gimbal may mount to a base platform and rotate about an axis passing through this mounting point. An inner gimbal may mount to the outer gimbal and rotate about an axis perpendicular to the axis of rotation of the outer gimbal. Two-axis gimbal systems are often deployed for LOS pointing, rather than higher-order gimbal systems, due to their simplicity of operation and lower cost.

However, control problems arise when attempting to point two-axis gimbals (e.g., azimuth-elevation gimbals) at +90° elevation ("zenith") and at −90° elevation ("nadir"). Notably, at gimbal zenith and nadir, the LOS is parallel to the azimuth axis of rotation. As a result, rotation about the azimuth axis does not move the LOS. This loss of azimuth pointing control is an example of a phenomenon referred to as "gimbal lock."

Control of azimuthal pointing is further complicated when the gimbal is attached to a moving platform. Notably, motion of the platform causes the gimbal LOS to move its position independently of movement by the gimbal axes. Accordingly, the gimbal axes must move to counteract the base motion of the platform in order to steady the LOS.

While control systems have been developed to stabilize LOS pointing in two-axis gimbal systems at or near gimbal zenith/nadir, these systems still exhibit significant error in azimuth pointing control. Accordingly, there is an ongoing need for improved systems and methods for azimuth control in two-axis gimbal pointing systems at near-nadir/zenith elevations.

SUMMARY

In an embodiment, a method of azimuthal pointing is provided for pointing of a line of sight (LOS). The method includes measuring, at a two-axis gimbal having an azimuth gimbal, an elevation gimbal, and a line of sight and kinematically coupled to a moveable platform, an acceleration of the moveable platform in an inertial frame of the line of sight, due to a motion of the moveable platform, and an acceleration of the azimuth gimbal relative to the platform, due to the motion of the moveable platform. The method also includes generating, by one or more processors, a first command signal commanding deflection of a two-axis pointing device kinematically coupled to the two-axis gimbal and positioned in the optical path of the line of sight. The first command signal is based upon the measured acceleration of the moveable platform and an acceleration rate command representative of a relative target motion with respect to the azimuth gimbal. The method also includes measuring, in the line of sight inertial frame, the deflection of the two-axis pointing device responsive to the first command signal. The method further includes generating, by the one or more processors, a second command signal commanding deflection of the azimuth gimbal based upon the deflection of the two-axis pointing device and the measured acceleration of the azimuth gimbal.

In additional embodiments, the method may include one or more of the following, alone or in combination. The first and second command signals are generated when the elevation gimbal is oriented at a selected angle. Generating the second command signal further includes generating the second command signal based upon the relative target motion. The method further includes generating, by the one or more processors, a third command signal commanding deflection of the azimuth gimbal. The third command signal is based upon the measured acceleration of the azimuth gimbal and the second command signal, where upon receipt of the third command signal by the azimuth gimbal, the azimuth gimbal moves so as to counter at least a portion of the deflection of the two-axis pointing device. The method also includes generating, by the one or more processors, an updated relative target motion based upon the deflection of the two-axis pointing device and the deflection of the azimuth gimbal responsive to the third command signal. Generating the first command signal further includes converting the acceleration of the moveable platform and the target acceleration into a frame of reference of the two-axis pointing device. Generating the second command signal further includes converting the acceleration of the azimuth gimbal into an azimuth gimbal angle in the frame of reference of the moveable platform and converting the deflection of the two-axis pointing device from a frame of reference of the two-axis pointing device into a deflection of the two-axis pointing device in the frame of reference of the moveable platform.

In another embodiment, an azimuthal pointing system for directing a line of sight is provided. The pointing system includes a two-axis gimbal kinematically coupled to a moveable platform, the two-axis gimbal further including an elevation gimbal, an azimuth gimbal, and a line of sight. The pointing system also includes a two-axis pointing system kinematically coupled to the two-axis gimbal and inserted within the optical path of the line of sight. The pointing system additionally includes a first sensor adapted to measure the angle and rate of the azimuth gimbal relative to the moveable platform. The pointing system also includes a second sensor adapted to measure inertial motion of the line of sight. The pointing system further includes one or more processors adapted to generate a first command signal and a second command signal. The first command signal commands deflection of the two-axis pointing device, the first command signal based upon a measurement, by the second sensor, of an acceleration of the moveable platform in an inertial frame of the line of sight, due to a motion of the moveable platform and an acceleration rate command representative of a relative target motion with respect to the azimuth gimbal. The second command signal commanding deflection of the azimuth gimbal, the second command signal based upon the deflection of the two-axis pointing device responsive to the first command signal and a measurement, by the first sensor, of an acceleration of the azimuth gimbal with respect to the moveable platform, due to the motion of the moveable platform.

In further embodiments, the pointing system may also include one or more of the following, alone or in combination. The one or more processors is further adapted to generate the second command signal based upon the rate command. The one or more processors is further adapted to generate a third command signal commanding deflection of the azimuthal gimbal, the third command signal based upon the acceleration of the azimuth gimbal and the second command signal. The two-axis pointing device includes an optical beam steering device adapted to steer the line of sight with respect to two rotation axes.

In an additional embodiment, a non-transitory computer-readable medium having computer-readable program codes embedded thereon is provided for comparing decision options, the computer-readable program codes including instructions that, when executed by a processor, cause the processor to measure, at a two-axis gimbal having an azimuth gimbal, an elevation gimbal, and a line of sight and kinematically coupled to a moveable platform, an acceleration of the moveable platform, in an inertial frame of the line of sight, due to a motion of the moveable platform and an acceleration of the azimuth gimbal, relative to the platform, due to the motion of the moveable platform, generate a first command signal commanding deflection of a two-axis pointing device kinematically coupled to the two-axis gimbal and positioned within the optical path of the line of sight, the first command signal based upon the measured acceleration of the moveable platform and a relative target motion with respect to the azimuth gimbal, measure, in the line of sight inertial frame, the deflection of the two-axis pointing device responsive to the first command signal, and generate a second command signal commanding deflection of the azimuth gimbal based upon the deflection of the two-axis pointing device and the measured acceleration of the azimuth gimbal.

In other embodiments, the computer readable medium may further include one or more instructions that, when executed, cause the processor to perform one or more of the following. Generate the second command signal based upon the relative target motion. Generate a third command signal commanding deflection of the azimuth gimbal based upon the measured acceleration of the azimuth gimbal and the second command signal. Generate an updated acceleration command commanding deflection of the azimuth gimbal based upon the deflection of the two-axis pointing device and the deflection of the azimuth gimbal responsive to the third command signal. Convert the acceleration of the azimuth gimbal into an azimuth gimbal angle in the frame of reference of the moveable platform and converting the deflection of the two-axis pointing device from a frame of reference of the two-axis pointing device into a deflection of the two-axis pointing device in the frame of reference of the moveable platform.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIGS. 2A-2D are schematic illustrations of gimbal directed line of sight (LOS) pointing as gimbal elevation moves towards zenith/nadir;

DETAILED DESCRIPTION

Figure 1:
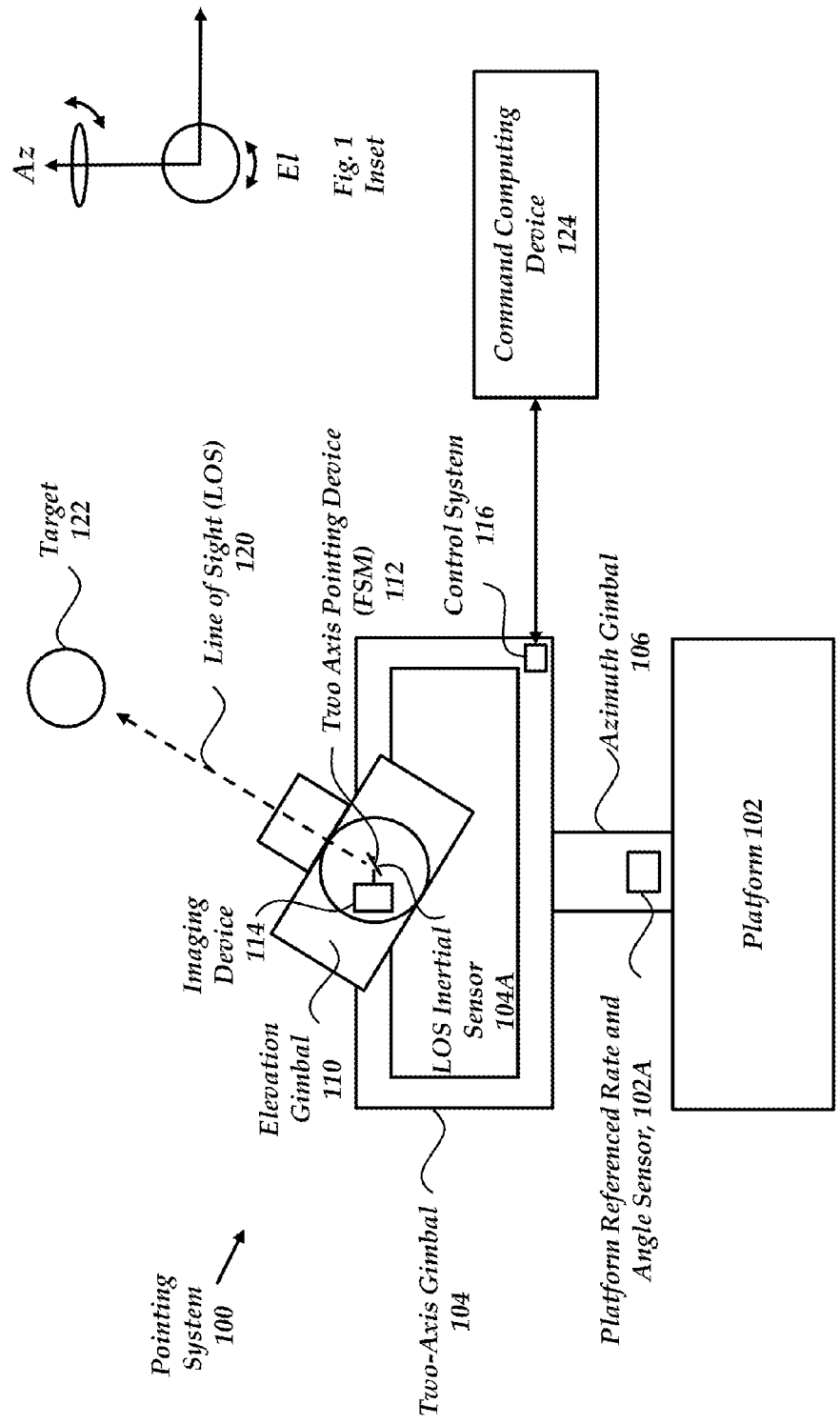
FIG. 1 is a schematic illustration of an embodiment of a two-axis gimbal pointing system.

When a two-axis gimbal pointing device is mounted to a vehicle, such as an aircraft, the outer gimbal is typically oriented with its axis of rotation extending parallel to the yaw axis and the inner gimbal is typically oriented with its axis of rotation perpendicular to that of the outer gimbal. So oriented, the outer gimbal provides rotation in the azimuth direction (i.e., in-plane rotation), while the inner gimbal provides rotation in the elevation direction (i.e., out of plane rotation).

Two-axis gimbals employ inertial sensors to stabilize the LOS with respect to the moving vehicle. That is to say, in order to accurately point the LOS towards a desired target, commands delivered to the gimbal azimuth and elevation axes must account for both the motion of the vehicle as well as motion of the gimbal axes independent of the vehicle motion that is necessary to point the LOS towards the desired target. For example, base motion of the platform may be counteracted by measuring the movement of the LOS due to the base motion by an inertial sensor and adjusting the gimbal mount based upon feedback from the inertial sensor to maintain a given LOS.

However, azimuth axis performance of two-axis gimbals degrades as the elevation angle deflects from 0°. Consider the example of FIG. 2A, which illustrates a spherical coordinate system overlaid upon Cartesian axes (x, y, z). The z-axis serves as the azimuth (Az) rotation axis of the two-axis gimbal and the y-axis serves at the elevation (El) rotation axis of the two-axis gimbal. The LOS is directed based upon motion of the Az and El gimbals about their respective axes.

In vehicles such as aircraft, body pitch and roll accelerations are coupled to the LOS by the sine of the elevation. When pointing towards a target (e.g., target 122) at 0° elevation (FIG. 2B), the LOS inertial sensor is aligned with the bearing and motor of the elevation axis (the elevation control authority axis), regardless of elevation, in order to allow freedom of movement in the El. In contrast, the LOS inertial sensor is only aligned with the azimuth axis (the control authority axis) at 0° deflection. As a result, there is no coupling on the elevation axis due to base motion at any deflection, while coupling is absent on the azimuth axis due to base motion only at 0° deflection.

As the elevation angle deflection increases from 0° to track the target 122, the azimuth control authority axis and the azimuth inertial feedback axis become out of alignment (FIG. 2C). For example, at 45° deflection, 71% of the aircraft body roll motion is coupled onto the LOS when looking towards the front or rear of the aircraft. When looking to either wing, 71% of the aircraft body pitch motion is so coupled. Furthermore, only 71% of the azimuth control authority axis motion is coupled onto the azimuth feedback sensor axis. This loss of control authority coupling in azimuth, and the increase of aircraft body roll and pitch disturbances, continues to grow as the depression angle increases. The signal to noise ratio (SNR) of the azimuth inertial rate feedback also continues to degrade with increasing deflection.

As deflection increases, the SNR degrades to a point where a coordinate frame switch is needed to maintain azimuth gimbal axis control. For example, the feedback sense axis for azimuth control may switch from the LOS inertial sensor to a sensor in the aircraft body reference frame, resulting in a loss of inertial reference frame line of sight control.

When the target reaches gimbal nadir/azimuth, the azimuth inertial feedback axis and bearing/motor pair are orthogonal (FIG. 2D). At this position, azimuth pointing control is completely lost, as rotation about the azimuth axis does not change the LOS pointing direction ("gimbal lock").

Given the loss of inertial pointing control approaching gimbal nadir/zenith, significant error is introduced into pointing control. As a result, there exists a volume of space (e.g., a conical volume) centered about gimbal nadir/zenith in which azimuth pointing control is severely limited.

Figure 3B:
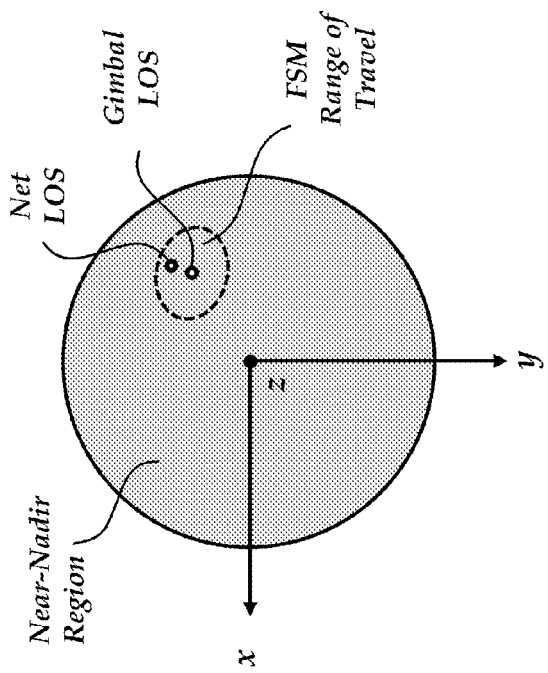
FIGS. 3A-3B are schematic illustrations of near-nadir movements of an embodiment of a two-axis pointing device employed for line of sight stabilization in a pointing system.
Figure 3A:
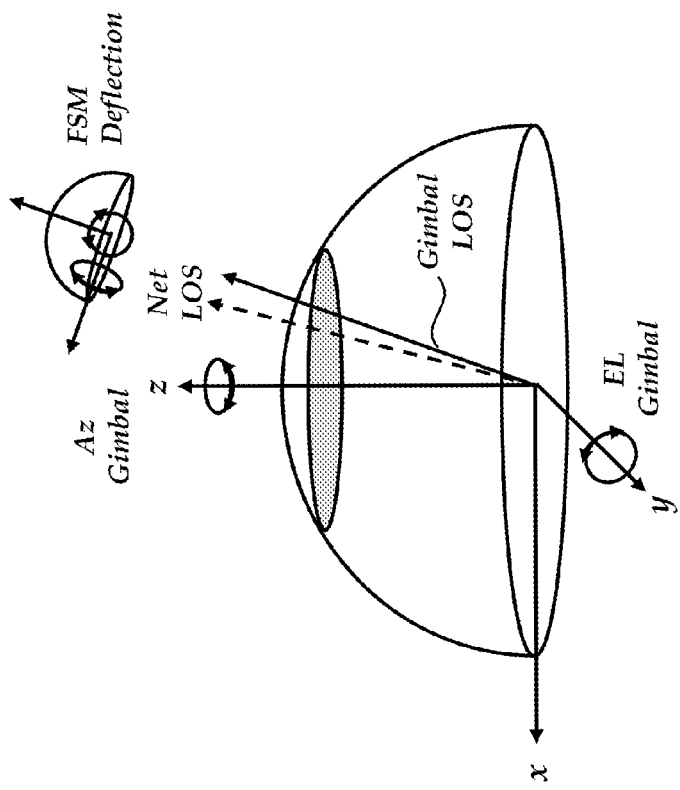

To address pointing problems near gimbal nadir/zenith, two-axis gimbal systems have been developed which further include a two-axis beam steering mirror, inserted into the optical path of the imaging sensor or beam director. This mirror may be referred to as a fast steering mirror (FSM) as its responsivity is several times faster than the classical mass stabilized gimbal axis. The FSM is coupled to the two-axis gimbal so that it moves with the LOS, as directed by the gimbal set ("gimbal LOS"). As illustrated in FIG. 3A, the FSM is aligned on both the elevation and azimuth gimbal axes and is further capable of deflection in two directions, independent of the gimbal set ("FSM deflection"). The LOS inertial sensor may be mounted to the FSM.

In the gimbal zenith/nadir region, since inertial pointing of the azimuth gimbal is lost, LOS pointing is controlled solely by deflection of the FSM, with no assistance from the gimbal set. The net LOS is, therefore, the sum of the gimbal LOS due to gimbal motion approaching the gimbal zenith/nadir region and further control of FSM deflection within the near-zenith/nadir region. For example, the residual error, the difference between the gimbal LOS position and a desired LOS position (e.g., the target position), may be provided as a command for control of the FSM deflection. Viewed in the azimuth plane (FIG. 3B), the FSM moves with respect to the gimbal LOS to achieve the net LOS.

This solution does not completely remedy the azimuth pointing control problem, however. Near gimbal zenith/nadir, the FSM provides all LOS pointing control, with no help from the gimbal set. The FSM possesses a finite deflection range and may encounter mechanical stops when attempting to stabilize the LOS due to base motion of the vehicle. As a result, when certain base motions occur (e.g., relatively large base motions), the FSM may be unable to completely execute desired pointing commands due to these mechanical limits, resulting in degraded LOS stabilization.

Embodiments of the present disclosure relate to control systems and methodologies for improved azimuthal pointing control in two-axis gimbal systems. For example, the disclosed embodiments may restore azimuth inertial pointing at near-nadir elevations. Under certain conditions, inertial pointing may be recovered at about nadir.

The improved pointing system may include a two-axis elevation-azimuth gimbal mounted to a moveable platform (e.g., a vehicle such as an aircraft, land-based vehicle, water-based vehicle, or the like). A two-axis pointing device, such as a fast steering mirror (FSM), is further provided, allowing deflection about two axes independently of the gimbal set. The system may further include sensors adapted to measure motion of the two-axis gimbal and the two-axis pointing device. For example, the sensors may include inertial sensors for measuring motion of the line of sight with respect to the moveable platform. The sensors may also include rate and angle sensors for measuring motion of the azimuth gimbal with respect to the moveable platform. The pointing system may further include a plurality of processors in communication with the respective sensors and motors of the two-axis gimbal and two-axis pointing device, the plurality of processors capable of generating commands for motion of the two-axis gimbal and the two-axis pointing device.

Figure 4B:
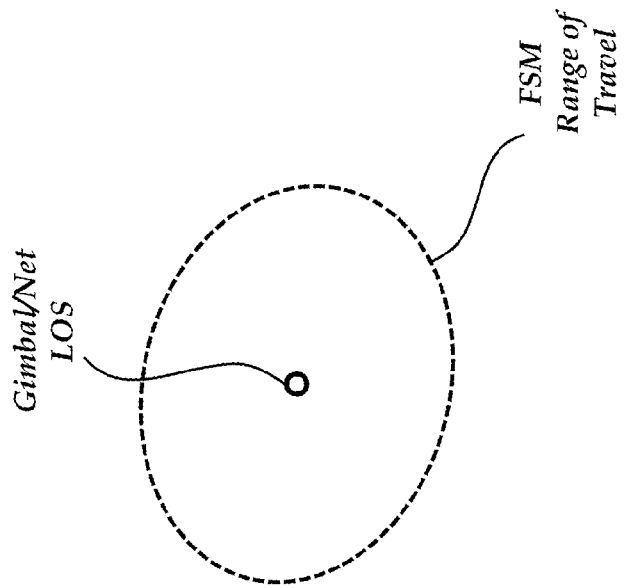
FIGS. 4A-4B are schematic illustrations of near-nadir movements of a pointing system of the present disclosure employing both a two-axis pointing device and a gimbal set for line of sight stabilization.
Figure 4A:
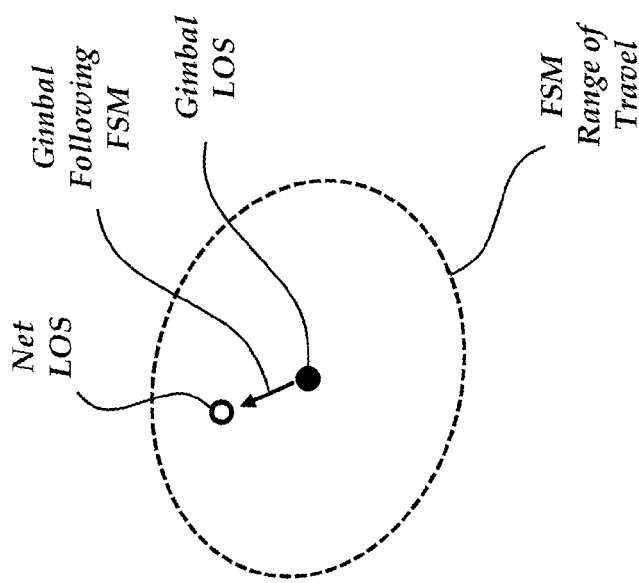

In an embodiment, the improved pointing system may implement a control process that employs feedback from the two-axis pointing device in order to restore inertial pointing control to the azimuth gimbal. FIGS. 4A-4B illustrate the deflection of the FSM with respect to its neutral position (the gimbal LOS position) and mechanical range. Once the two-axis pointing device has moved (FIG. 4A), the deflection of the two-axis pointing device may be used as a command for motion of the gimbal set. That is to say, the gimbal set may "follow" the deflection of the FSM so to move the gimbal LOS as close as possible to the net LOS achieved by the FSM. As the gimbal set is moved in reference to the FSM deflection, and the FSM motion is inertially controlled, this process of controlling the gimbal set in the near-nadir region effectively restores inertial pointing control to the gimbal set.

This coordinated motion of the two-axis pointing device with the gimbal set also has the advantage of inhibiting the two-axis pointing device from encountering mechanical limits that would inhibit its range of motion. As the gimbal LOS moves towards the net LOS position (FIG. 4B), the FSM moves closer to its center or neutral position, from which the FSM is capable of moving its maximum travel distance. As a result, the FSM is capable of counteracting greater base-motion disturbances than would otherwise be possible if the FSM were positioned closer to its mechanical limits, improving the stabilizing ability of the FSM.

Furthermore, embodiments of the present disclosure may provide inertial pointing exactly at nadir in the case of limited vehicle base motion dynamics. For example, as long as the LOS inertial deflections remain within the field of regard of the FSM, inertial pointing is retained without the need for gimbal set following motion.

For clarity, embodiments of the present disclosure may be discussed in terms of nadir and near-nadir elevations. It may be understood, however, that such references may also apply to zenith and near-zenith elevations, as appropriate.

The discussion will now turn to FIG. 1, which schematically illustrates an embodiment of a pointing system 100 of the present disclosure. The system 100 includes a two-axis gimbal 104, a two-axis pointing device 112, and a control system 116. As discussed in greater detail below, motion of two-axis gimbal 104 and the two-axis pointing device 112 may be controlled by commands, issued from the control system 116, that direct the LOS of an imaging device 114 in desired directions (e.g., towards a target location 122).

In a preferred embodiment, the imaging device 114 is an optical imaging device, such as a still or video camera. In alternative embodiments, the imaging device 114 is an electro-optical transmitter (e.g., a laser). However, embodiments of the disclosure may be adapted for use with any electro optic transmitter or receiver, alone or in combination, as necessary.

In certain embodiments, the platform 102 may be any structure upon which the two-axis gimbal 104 may be mounted. In certain embodiments, the platform 102 is a moveable platform, such as a vehicle (e.g., a land-based vehicle, water-based vehicle, aircraft, etc.). In alternative embodiments, the platform 102 may be a stationary platform.

The two-axis gimbal 104 may include two gimbals, one mounted upon the other, with orthogonal pivot axes. Assuming the horizon as a reference plane, the first gimbal may be oriented with its axis of rotation perpendicular to the reference plane, designated azimuth gimbal 106. The second gimbal may be oriented perpendicular to the azimuth gimbal 106, designated elevation gimbal 110. For example, as illustrated in FIG. 1, the elevation gimbal 110 may be mounted to the azimuth gimbal 106. However, in alternative embodiments, any two-axis gimbal may be employed. The two-axis gimbal 104 may be directly coupled (e.g., kinematically coupled) to the platform 102 via the azimuth gimbal 106. The imaging device 114 may also be coupled to the two-axis gimbal 104 to direct the LOS axis of the imaging device.

The two-axis pointing device 112 is a device which allows further steering of the LOS of the imaging device 114 by motion along two axes, independently of the two-axis gimbal 104. For example, a plurality of mirrors, lenses, or other beam steering devices (not shown) may be employed to direct the LOS from the imaging device 114 to the two-axis pointing device 112. In general, the two-axis pointing device is a beam steering device capable of relatively faster movement than the two-axis gimbal 104. In certain embodiments, the two-axis pointing device 112 is a fast-steering mirror (FSM). For example, the two-axis pointing device 112 may include a first mirror, nominally mounted parallel to a flat base, allowing the first mirror to pivot about a central point near its surface. Actuators may be mounted in perpendicular axis pairs between the edges of the mirror and the base. The actuator pairs may be driven in a push-pull motion to rotate the mirror about two orthogonal axes, allowing two-axis angular scanning. In alternative embodiments, the two-axis pointing device may be any type of optical beam steering device, such as refractive or reflective beam steering devices.

The control system 116 may include a plurality of processors in electrical communication with a plurality of sensors. Examples of the sensors may include, but are not limited to, a rate and angle sensor 102A that is referenced to the platform and an LOS inertial sensor 104A. The rate and angle sensor 102A may provide measurements of the rate and angle of the azimuth gimbal 106 with respect to the platform 102. For example, the rate and angle sensor 102A may be a tachometer for rate sensing and a resolver or encoder for angle sensing. The LOS inertial sensor 104A may be a two-axis gyroscope or two single axis gyroscopes mounted to a lens within the optical path of the LOS. The sensors 102A, 104A may be further adapted to output signals representative of the detected motions to the control system 116.

The control system 116 may also be in communication with the two-axis gimbal 104, the two-axis pointing device 112, and a command computing device 124. As discussed in greater detail below, when the pointing system 100 is mounted to a platform 102 in motion, in order to maintain the LOS 120 pointed at the target 122, the pointing system 100 must move so as to counteract the underlying motion of the platform 102, as well as any relative motion of the target 122 with respect to the two-axis gimbal 104 and the platform 102.

The control system 116 may receive commands from the command computing device 124 for commanding motion of the two-axis gimbal 104 to follow the relative motion of the target 122 with respect to the two-axis gimbal. However, the commands from the command computing device 124 do not account for the base motion of the moving platform 102. Accordingly, the control system 116 may further receive feedback from the sensors 102A, 104A reflecting the underlying motion of the platform 102. The control system 116 may employ both the commands received from the command computing device 124 and the feedback from sensors 102A, 104A to generate new commands for movement of the two-axis gimbal 104 and the two-axis pointing device 112.

Figure 5:
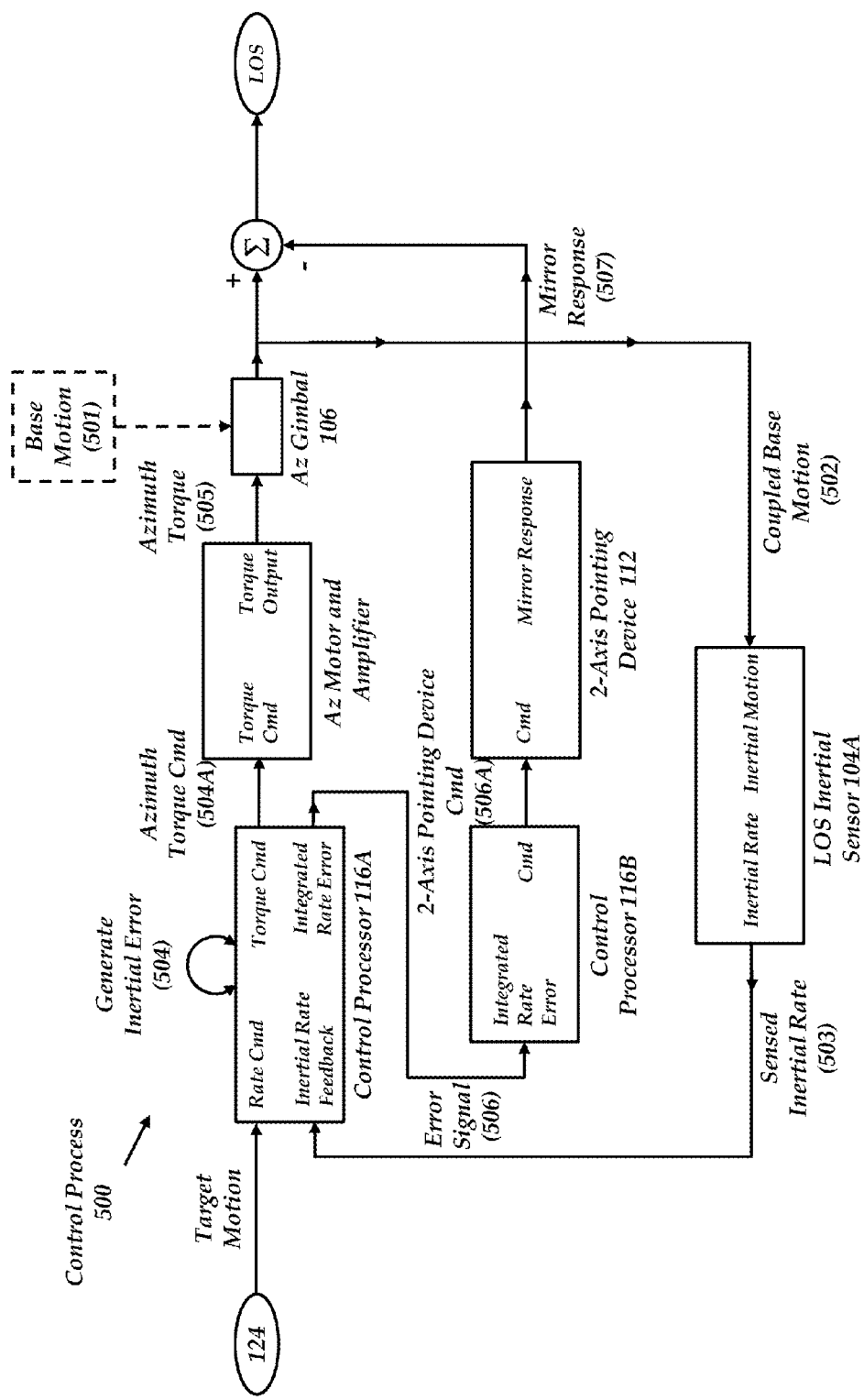
FIG. 5 is a schematic illustration of an embodiment of a control system for nominal azimuthal pointing outside of the near-nadir region.

The discussion will now turn to FIG. 5, which presents a schematic illustration of a control process 500 implemented by the control system 116 for azimuthal pointing of the system 100 when the deflection of the elevation gimbal 110 is outside the nadir/near-nadir region. For example, in an embodiment, the control process 500 may be employed at elevation deflections less than about 60°, preferably less than about 80°. However, it may be understood that the exact range of elevation gimbal deflections over which the control process 500 is performed depends upon the servo tuning of a particular installation of the pointing system 100, as reflected in the signal to noise ratio (SNR) of the azimuth inertial rate feedback. Accordingly, one of ordinary skill in the art may determine acceptable ranges of SNR for azimuthal pointing control employing the process 500 on a deployment-by-deployment basis.

The control process 500 may employ the LOS inertial sensor 104A to measure the base motion of the platform 102 with respect to the gimbal LOS 120. The control process 500 also receives, as input, commands representative of relative target motion from the command computing device 124. Movement of the azimuth gimbal 106 provides relatively coarse stabilization of the LOS 120, while movement of the two-axis pointing device 112 provides relatively fine stabilization of the LOS 120.

For clarity of description, the process 500 has been labeled with operations 501-507. However, it may be understood that the control process 500 is a continuous process performed by the control system 116 and is not limited to particular starting or ending point.

In operation 501, base motion accelerations of the platform 102 occur. In operation 502, the base motion accelerations of the platform 102 are coupled to the LOS inertial sensor 104A through the two-axis gimbal 104 kinematically mounted to the platform 102. These base motions torque the LOS inertial sensor 104A in the inertial reference frame of the LOS 120 and introduce image instability. In operation 503, the LOS inertial sensor 104A observes the coupled base motion accelerations on the azimuth feedback sense axis with respect to the gimbal LOS 120 and outputs the sensed inertial rate to a first control processor 116A.

The control processor 116A further receives signals from the command computing system 124 commanding motion of the azimuth gimbal 104 to follow the motion of the target 122 with respect to the two-axis gimbal 104 and platform 102. For example, the signals from the command computing system 124 may include an angular rate command for a desired sensor line of sight pan rate. Based upon the sensed inertial rate and the angular rate command, the control processor 116A may generate separate commands for motion of the azimuth gimbal 106 and the two-axis pointing device 112.

In order to generate motion commands for each of the azimuth gimbal 106 and the two-axis pointing device 112, the first control processor 116A generates an inertial error signal differencing the angular rate command and the observed inertial rate measured along the feedback sense axis of the LOS inertial sensor 104A in operation 504. The inertial error signal is representative of the difference between the currently measured angular rate of the gimbal LOS 120 and a desired angular rate of the gimbal LOS 120. Separate commands may be provided to both the azimuth gimbal 106 and the two-axis pointing device 112 in order to minimize the inertial error signal as much as possible. By minimizing the inertial error signal, the difference between a desired LOS and the actual LOS is reduced to greatest degree possible.

In operation 504A, commands for motion of the azimuth gimbal 106 are generated by the control processor 116A and provided to an azimuth motor and amplifier in communication with the azimuth gimbal 106. In order to generate the azimuth motor torque commands, the control processor 116A applies a pre-defined control law to minimize the inertial error signal. For example, the control law may be proportional plus integral control. In response to the received torque command, the azimuth motor and amplifier move the azimuth gimbal 106 along the control authority axis to minimize the inertial rate error. The remaining, residual rate error represents the coarse stabilization performance of the control system 116.

In operations 506, 506A, commands for motion of the two-axis pointing system 112 are generated. In operation 506, the control processor 116A integrates the coarse inertial rate error signal and transmits this signal to a second control processor 116B. However, the integrated rate error signal is not suitable for use as an input command for motion of the two-axis pointing device. Accordingly, in operation 506A, the control processor 116B operates on the received integrated rate error to generate commands suitable for the two-axis pointing system 112 and outputs commands for the two-axis pointing device 112. For example, operations on the integrated rate error may include phase and amplitude corrections as well as rotation into the frame of reference of the two-axis pointing device 112.

The commands output by the control processor 116B are received by the two-axis pointing device 112. In an embodiment, the two-axis pointing device 112 may be a two-axis fast steering mirror inserted into the optical path of the imaging device 114. In response to the received commands, the two-axis pointing device 112 may dynamically steer the optical axis of the imaging device 114 by an amount approximately equal in magnitude, and opposite in direction, to the integrated inertial rate error, further reducing the LOS inertial error (operation 507). The remaining residual rate error represents the fine stabilization performance of the pointing system 100.

The combination of coarse LOS stabilization provided by the azimuth gimbal 106 and the fine LOS stabilization provided by the two-axis pointing device 112, symbolically illustrated in FIG. 5 as Σ, represents the final LOS position after one control loop. While the control process 500 has been discussed in terms of sequential operations, it may be understood that each of the coarse control loop (operations 501-505) and the fine control loop (operations 506-507) may be performed continuously and concurrently for LOS positioning control.

Figure 6:
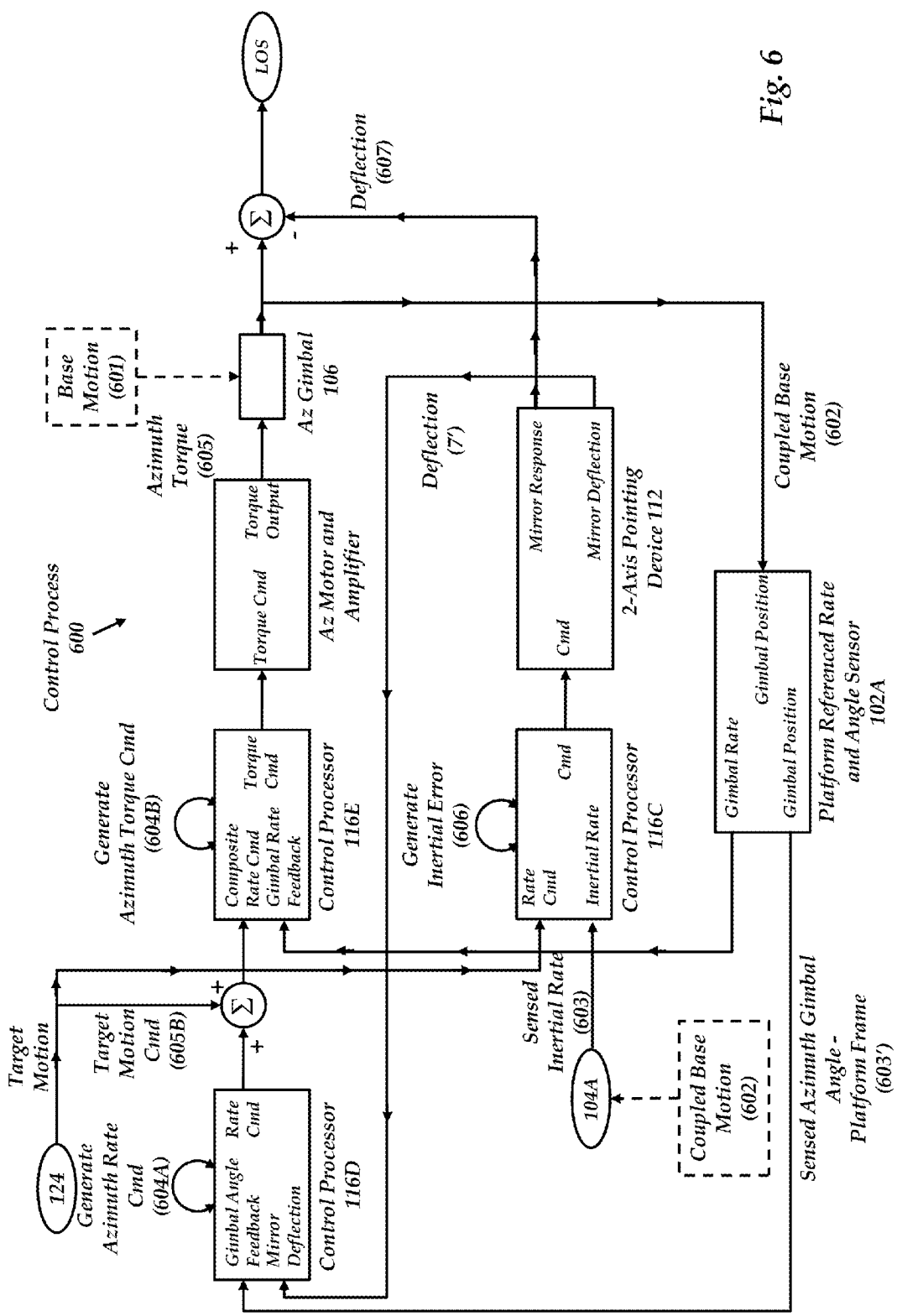
FIG. 6 is a schematic illustration of an embodiment of a control system for near-nadir azimuthal pointing.

The discussion will now turn to FIG. 6, which presents a schematic illustration of a control process 600 implemented by the control system 116 for azimuthal pointing of the system 100 when the deflection of the elevation gimbal 110 is within the nadir/near-nadir region. As above, the control process 600 is operative to control the azimuth gimbal 106 and two-axis pointing device 112 for LOS pointing. However, owing to the difficulties in LOS inertial control of the azimuth gimbal 106 at nadir/near nadir deflections, the control process 600 employs the LOS inertial sensor 104A for pointing control of the two-axis pointing device 112, allowing LOS inertial pointing control to be maintained. However, given the limited degree of travel of the two-axis pointing device 112, controlling LOS pointing only by the two-axis pointing device 112 may cause the two-axis pointing device 112 to reach its mechanical limits and be unable to fully move in a desired direction.

In order to avoid this difficulty, the process 600 may also employ the output deflection of the two-axis pointing device 112 to further steer the azimuth gimbal 106 in a manner which follows the two-axis pointing device 112. As the range of motion of the azimuth gimbal 106 is much larger than the two-axis pointing device 112, this motion of the azimuth gimbal 106 may inhibit the two-axis pointing device 112 from reaching its mechanical limits.

In an embodiment, the control process 600 may be employed at elevation deflections greater than or equal to 60°, greater than or equal to 70°, greater than or equal to 80°, etc. However, as discussed above, the exact range of elevation gimbal deflections over which the control process 600 is performed may depend upon the servo tuning of a particular installation of the pointing system 100, as reflected in the SNR of the azimuth inertial rate feedback. Accordingly, one of ordinary skill in the art may determine unacceptable ranges of SNR for azimuthal pointing control employing the process 500 on a deployment-by-deployment basis and instead employ the control process 600 within this regime.

For clarity of description, the process 600 has been labeled with operations 601-607. However, it may be understood that the control process 600 is a continuous process performed by the control system 116 and is not limited to particular starting or ending point.

Control of the motion of the two-axis pointing device 112 will now be discussed with reference to operations 601-603, and 606-607. In operation 601 and 602, similar to operations 501, 502 discussed above, base motion accelerations of the platform 102 occur during motion of the platform 102. The base motion accelerations of the platform 102 are coupled to the LOS inertial sensor 104A through the two-axis gimbal 104 kinematically mounted to the platform 102. These base motions torque the LOS inertial sensor 104A in the inertial reference frame of the LOS 120 and introduce image instability. The LOS inertial sensor 104A measures the coupled base motion accelerations on the azimuth feedback sense axis, representative of the acceleration of the moving platform 102, in the LOS inertial frame, due to the motion of the moveable platform 102.

In operation 603, the LOS inertial sensor 104A further outputs a signal representative of the measured acceleration. In contrast with process 500, however, the inertial rate measured by the LOS inertial sensor 104A is received by a third control processor 116C, in communication with the two-axis pointing device 112, rather than control processor 116A in communication with the azimuth gimbal. The control processor 116C also receives signals (e.g., angular rate commands) from the command computing system 124 commanding motion of the pointing system 100 to follow the motion of the target 122 with respect to the two-axis gimbal 104. For example, the signals from the command computing system 124 may include an angular rate command for a desired sensor line of sight pan rate.

In operation 606, the control processor 116C generates a command signal commanding deflection of the two-axis pointing device 112 and outputs commands for the two-axis pointing device 112. The command signal is based upon the measured acceleration of the moveable platform 102 received from the LOS inertial sensor 104A and the relative target motion with respect to the two-axis gimbal 104. For example, the control processor 116C generates an inertial error signal by differencing the angular rate command and the observed inertial rate measured along the feedback sense axis of the LOS inertial sensor 104A. The inertial error signal is representative of the difference between the currently measured angular rate of the two-axis pointing device 112 and a desired angular rate of the two-axis pointing device 112. By moving the two-axis pointing device 112 in a manner which minimizes the inertial error signal, the difference between a desired LOS and the actual LOS is reduced to greatest degree possible.

As discussed above with respect to operation 506A, the control processor 116C may also integrate the inertial error and operate on the integrated inertial error in order to generate commands suitable for the two-axis pointing system 112. For example, operations may include phase and amplitude corrections as well as rotation into the frame of reference of the two-axis pointing device 112.

The commands output by the control processor 116C are received by the two-axis pointing device 112. In an embodiment, the two-axis pointing device 112 may be a two-axis fast steering mirror inserted into the optical path of the imaging device 114. In response to the received commands, the two-axis pointing device 112 may dynamically steer the optical axis of the imaging device 114 by an amount approximately equal in magnitude, and opposite in direction, to the integrated inertial rate error, reducing the LOS inertial error (operation 607). The remaining, residual rate error represents the stabilization performance of the two-axis pointing device 112.

Control of the motion of the azimuth gimbal 106 will now be discussed with reference to operations 601-605. In operation 601 and 602, similar to operations 501, 502 discussed above, base motion accelerations of the platform 102 occur during motion of the platform 102. The base motion accelerations of the platform 102 are coupled to the rate and angle sensor 102A. The rate and angle sensor 102A measures the acceleration of the azimuth gimbal relative to the platform 102, due to the motion of the moveable platform. The sensor 102A may further output the sensed gimbal rate and a gimbal position calculated from the measured motion of the azimuth gimbal 106 relative to the platform 102. The gimbal position may be provided to the control processor 116D, while the gimbal rate may be provided to a control processor 116E.

In operation 604A, the control processor 116D may generate an azimuth rate command and output this azimuth rate command to the control processor 116E. The azimuth rate command may be based upon the deflection of the two-axis pointing device and the gimbal angle feedback. The rate command may command movement of the azimuth gimbal 106 so as to counteract the deflection of the two-axis pointing device 112. As a result, the process 600 may inhibit the two-axis pointing device from reaching its mechanical limits.

The rate command output by the control processor 116D may be further modified by the angular rate command output by the command computing system 124 (operation 604B), prior to receipt by the control processor 116E. That is to say, the command input to the azimuth gimbal 106 may be based upon the relative motion of the target 122 with respect to the azimuth gimbal 106 as well as the deflection of the two-axis pointing device 112. This composite command is input to the control processor 116E and has the benefit of moving the azimuth gimbal 106 to account for both movement of the two-axis pointing device 112 as well as the target movement.

In operation 604B, commands for motion of the azimuth gimbal 106 are generated by the control processor 116E and provided to an azimuth motor and amplifier in communication with the azimuth gimbal 106. As discussed above, the control processor 116E receives both the composite command signal as well as the gimbal rate feedback. In order to generate the azimuth motor torque commands, the control processor 116E differences the composite rate command with the gimbal rate feedback to determine an error signal and further applies a pre-defined control law to minimize the error signal. For example, the control law may be proportional plus integral control.

In response to the received torque command, the azimuth motor and amplifier move the azimuth gimbal 106 along the control authority axis to minimize the inertial rate error and maximize mechanical travel of the two-axis pointing device 112 (operation 605). The remaining, residual rate error represents the stabilization performance of the azimuth gimbal 106.

The combination of LOS stabilization provided by the azimuth gimbal 106 and the two-axis pointing device 112 are symbolically represented in FIG. 6 as E, the final LOS position after one control loop. While the control process 600 has been discussed in terms of sequential operations, it may be understood that control of the azimuth gimbal 106 and the two-axis pointing device 112 may be performed continuously and concurrently for LOS positioning control.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of azimuthal pointing of a line of sight (LOS), comprising:
   measuring, at a two-axis gimbal having an azimuth gimbal, an elevation gimbal, and a line of sight and kinematically coupled to a moveable platform:
      an acceleration of the moveable platform in an inertial frame of the line of sight, due to a motion of the moveable platform; and
      an acceleration of the azimuth gimbal relative to the platform, due to the motion of the moveable platform;
   generating, by one or more processors, a first command signal commanding deflection of a two-axis pointing device kinematically coupled to the two-axis gimbal and positioned in the optical path of the line of sight, the first command signal based upon the measured acceleration of the moveable platform and an acceleration rate command representative of a relative target motion with respect to the azimuth gimbal;
   measuring, in the line of sight inertial frame, the deflection of the two-axis pointing device responsive to the first command signal; and
   generating, by the one or more processors, a second command signal commanding deflection of the azimuth gimbal based upon the deflection of the two-axis pointing device and the measured acceleration of the azimuth gimbal.

2. The method of claim 1, wherein the first and second command signals are generated when the elevation gimbal is oriented at a selected angle.

3. The method of claim 1, wherein generating the second command signal further comprises generating the second command signal based upon the relative target motion.

4. The method of claim 1, further comprising generating, by the one or more processors, a third command signal commanding deflection of the azimuth gimbal, the third command signal based upon the measured acceleration of the azimuth gimbal and the second command signal, wherein upon receipt of the third command signal by the azimuth gimbal, the azimuth gimbal moves so as to counter at least a portion of the deflection of the two-axis pointing device.

5. The method of claim 4, further comprising generating, by the one or more processors, an updated relative target motion based upon the deflection of the two-axis pointing device and the deflection of the azimuth gimbal responsive to the third command signal.

6. The method of claim 1, wherein generating the first command signal further comprises converting the acceleration of the moveable platform and the target acceleration into a frame of reference of the two-axis pointing device.

7. The method of claim 1, wherein generating the second command signal further comprises converting the acceleration of the azimuth gimbal into an azimuth gimbal angle in the frame of reference of the moveable platform and converting the deflection of the two-axis pointing device from a frame of reference of the two-axis pointing device into a deflection of the two-axis pointing device in the frame of reference of the moveable platform.

8. An azimuthal pointing system, comprising:
a two-axis gimbal kinematically coupled to a moveable platform, the two-axis gimbal further including an elevation gimbal, an azimuth gimbal, and a line of sight;
a two-axis pointing system kinematically coupled to the two-axis gimbal and inserted within the optical path of the line of sight;
a first sensor adapted to measure the angle and rate of the azimuth gimbal relative to the moveable platform;
a second sensor adapted to measure inertial motion of the line of sight;
one or more processors adapted to generate:
a first command signal commanding deflection of the two-axis pointing device, the first command signal based upon:
a measurement, by the second sensor, of an acceleration of the moveable platform in an inertial frame of the line of sight, due to a motion of the moveable platform; and
an acceleration rate command representative of a relative target motion with respect to the azimuth gimbal; and
a second command signal for commanding deflection of the azimuth gimbal, the second command signal based upon:
the deflection of the two-axis pointing device responsive to the first command signal; and
a measurement, by the first sensor, of an acceleration of the azimuth gimbal with respect to the moveable platform, due to the motion of the moveable platform.

9. The system of claim 8, wherein the one or more processors is further adapted to generate the second command signal based upon the rate command.

10. The system of claim 9, wherein the one or more processors is further adapted to generate a third command signal commanding deflection of the azimuthal gimbal, the third command signal based upon the acceleration of the azimuth gimbal and the second command signal.

11. The system of claim 8, wherein the two-axis pointing device comprises an optical beam steering device adapted to steer the line of sight with respect to two rotation axes.

12. A non-transitory computer-readable medium having computer-readable program codes embedded thereon for comparing decision options, the computer-readable program codes including instructions that, when executed by a processor, cause the processor to:
measure, at a two-axis gimbal having an azimuth gimbal, an elevation gimbal, and a line of sight and kinematically coupled to a moveable platform:
an acceleration of the moveable platform, in an inertial frame of the line of sight, due to a motion of the moveable platform; and
an acceleration of the azimuth gimbal, relative to the platform, due to the motion of the moveable platform;
generate a first command signal commanding deflection of a two-axis pointing device kinematically coupled to the two-axis gimbal and positioned within the optical path of the line of sight, the first command signal based upon the measured acceleration of the moveable platform and a relative target motion with respect to the azimuth gimbal;
measure, in the line of sight inertial frame, the deflection of the two-axis pointing device responsive to the first command signal; and
generate a second command signal commanding deflection of the azimuth gimbal based upon the deflection of the two-axis pointing device and the measured acceleration of the azimuth gimbal.

13. The computer-readable medium of claim 12, further including instructions that, when executed, cause the processor to generate the second command signal based upon the relative target motion.

14. The computer-readable medium of claim 12, further including instructions that, when executed, cause the processor to generate a third command signal commanding deflection of the azimuth gimbal based upon the measured acceleration of the azimuth gimbal and the second command signal.

15. The computer-readable medium of claim 14, further including instructions that, when executed, cause the processor to generate an updated acceleration command commanding deflection of the azimuth gimbal based upon the deflection of the two-axis pointing device and the deflection of the azimuth gimbal responsive to the third command signal.

16. The computer-readable medium of claim 12, further including instructions that, when executed, cause the processor to convert the acceleration of the azimuth gimbal into an azimuth gimbal angle in the frame of reference of the moveable platform and converting the deflection of the two-axis pointing device from a frame of reference of the two-axis pointing device into a deflection of the two-axis pointing device in the frame of reference of the moveable platform.

* * * * *